Figure 4:
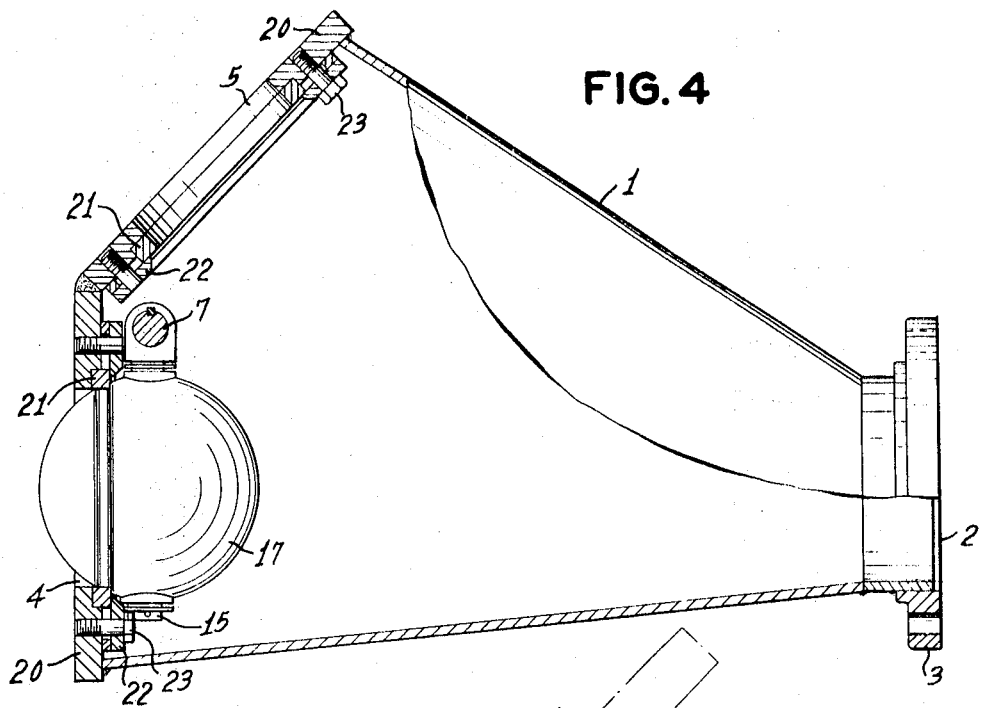

United States Patent

[11] 3,587,648

| [72] | Inventor | Ralph L. Capriola |
| | | Darien, Conn. |
| [21] | Appl. No. | 777,946 |
| [22] | Filed | Oct. 7, 1968 |
| [45] | Patented | June 28, 1971 |
| [73] | Assignee | Pullman Incorporated |
| | | Chicago, Ill. |
| | | Continuation-in-part of application Ser. No. 677,619, Oct. 24, 1967. |

[54] VALVE
10 Claims, 6 Drawing Figs.

[52] U.S. Cl. ............................................ 137/625.44
[51] Int. Cl. ............................................. F16k 11/02
[50] Field of Search ................................. 137/625.44, 612; 251/298, 299, 303

[56] References Cited
UNITED STATES PATENTS

| 2,204,885 | 6/1940 | Chamberlin | 137/625.44 |
| 2,694,414 | 11/1954 | Seyferth | 137/625.44 |
| 2,912,012 | 11/1959 | Klingler | 137/625.44 |
| 3,176,720 | 4/1965 | Donahue | 137/625.44 |

Primary Examiner—M. Cary Nelson
Assistant Examiner—R. B. Rothman
Attorneys—Marilyn J. Maue and John C. Quinlan ABSTRACT: A ball valve having the ball mounted for rotation about, and displacement along its carrying shaft and adapted to be seated in an outlet port having a seat so disposed angularly to the path of the ball that contact of the ball with the seat rotates the ball about the shaft and displaces the ball along the shaft to prevent continuous seating of the ball in identical orientations within the port.

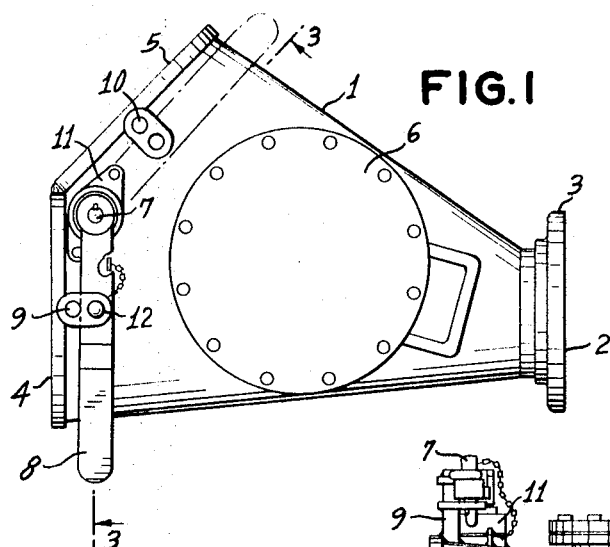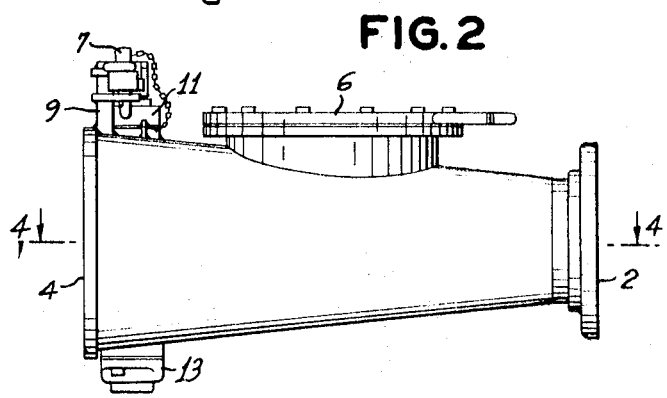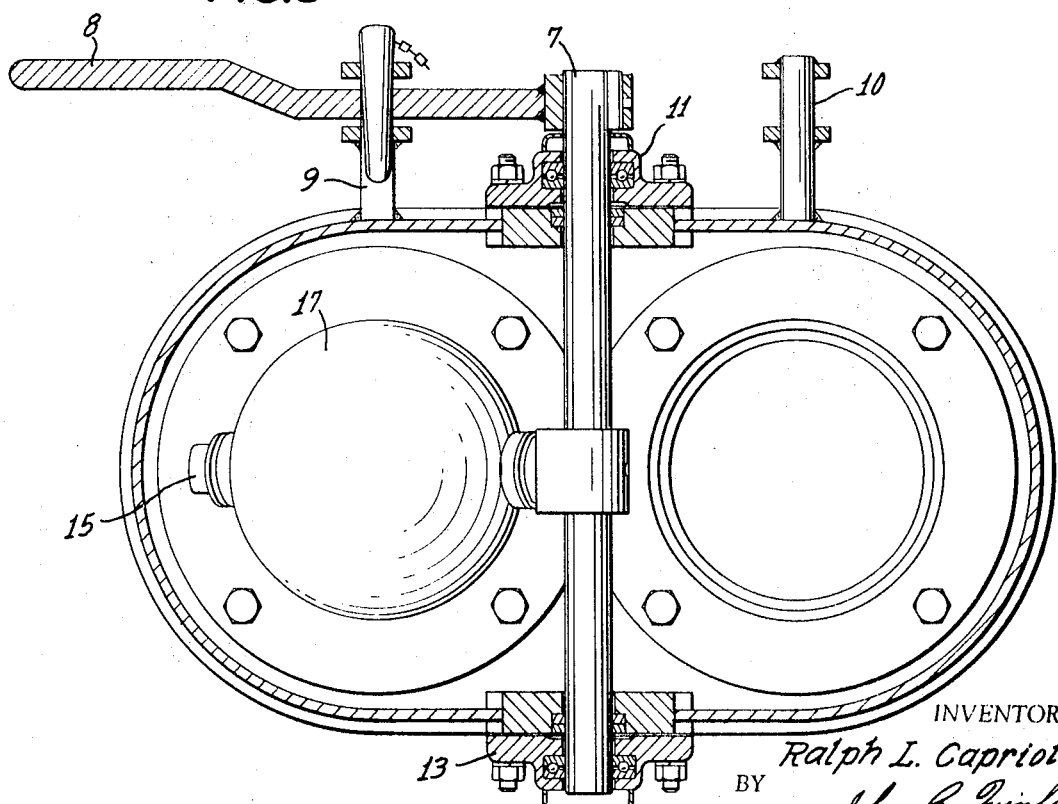

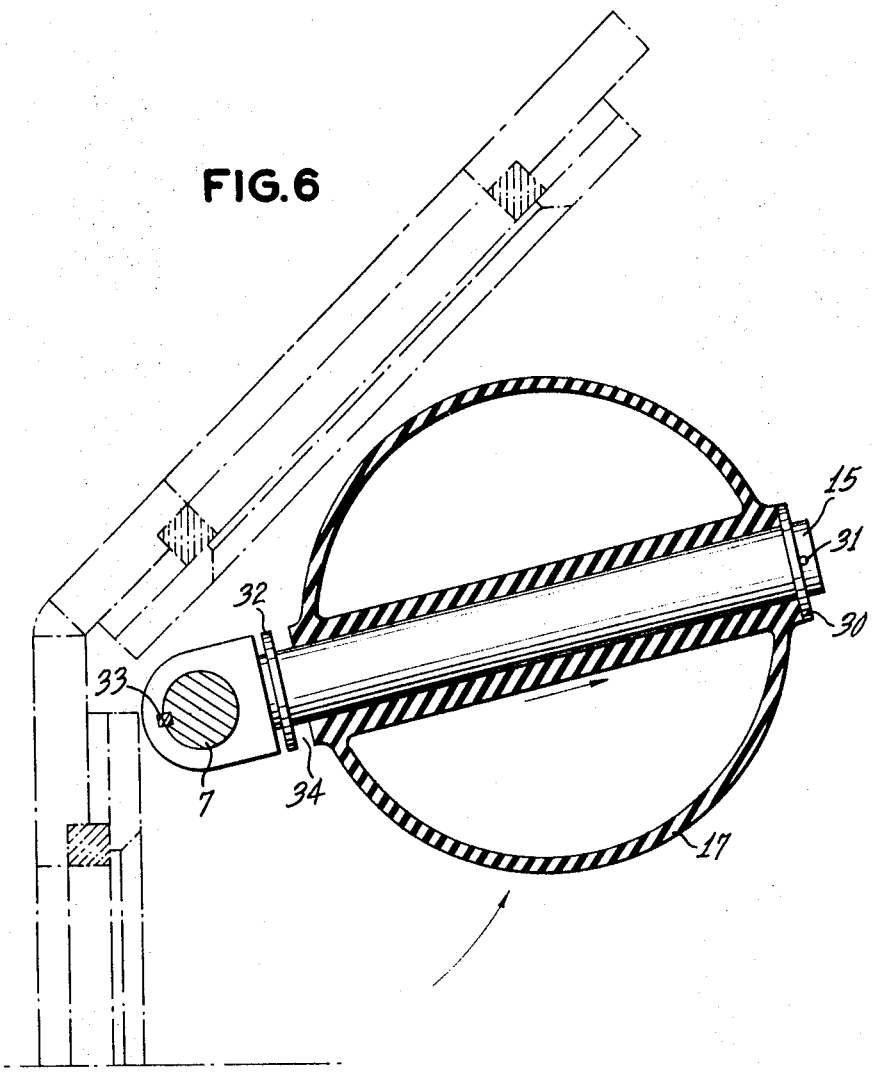

VALVE

This case is a continuation-in-part of copending application Ser. No. 677,619 filed Oct. 24, 1967.

The present invention relates to valves. More particularly, it relates to ball valves used to control the flow of liquids or particulate solids under substantial pressure.

Ball valves are very useful in certain fluid control systems inasmuch as they characteristically have a low pressure drop and are particularly adaptable as valves of the multiport variety, usable where large port sizes are involved.

The valve of this invention is generally usable as a gas or fluids flow control device but is more particularly useful as a control device for the flow of particulate solids, suspensions of solids in fluids and, in general, for the flow of erosive materials, One of the specific uses of the valve of this invention is as a multiport cement diverting valve.

Because of the manner in which ball valves seat within the port, such valves are usually subjected to uneven port seat wear and to uneven wear of the ball itself. Such wear is particularly evident in valves in which the ball is swung through an arc in such a manner that, regardless of the port in which it is seated, one portion of the ball makes contact with the port seat prior to other portions of the ball, with the result that that portion of the ball making initial contact with the seat undergoes scuffing and wear as it acts as a pivot point for the ball. Simultaneously, other portions of the ball undergo scuffing and wear as the ball is forcefully seated through a sliding action of ball upon seat. Such wear of both ball and seat undesirably limits the number of leak-free cycles of operation to which the valve can be subjected before requiring replacement or repair.

Accordingly, it is the object of this invention to provide an improved ball valve.

It is another object of this invention to provide a novel and improved valve seat arrangement for use in ball valves.

It is still another object of this invention to provide a valve having a novel and improved ball-seat relationship.

It is yet another object of this invention to provide a valve having a novel method of ball seating.

These and other objects and advantages of the invention will appear more fully from the following description of this invention in connection with the appended drawings hereinafter referred to.

In accordance with this invention there is provided a valve comprising a valve body having at least one inlet port and at least one outlet port, a rotatable sphere disposed within the housing, adapted to be positionable in an outlet port and operable by a valve shaft, said outlet port being equipped with a circular seat positioned in such a manner that initial contact of the sphere with the seat is at one of the arc quadrants of the circular seat which is distant from the valve shaft.

Figure 5:
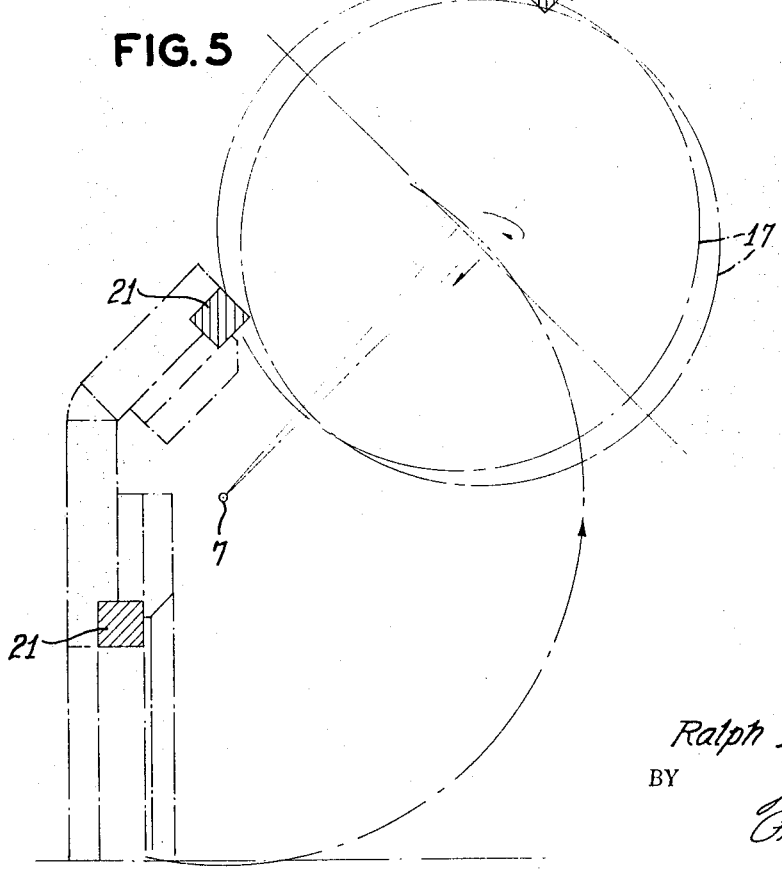

Reference is now made to the accompanying drawing in which:

FIG. 1 is a plan view of the valve;
FIG. 2 is a side elevation of the valve;
FIG. 3 is an end elevation view of the valve taken through section 3–3 of FIG. 1;
FIG. 4 is a plan view of the valve taken through section 4–4 of FIG. 2;
FIG. 5 is a phantom view of the path of closure of the valve; and
FIG. 6 is a view of the mounting of the ball within the valve body.

With reference now to FIG. 1, valve body 1 has inlet 2 formed of inlet flange 3, and flanged outlets 4 and 5. Access to the internal of body 1 is had through bolted cover 6. Valve shaft 7 is rotatable by means of lever arm 8 which swings between stops 9 and 10, and which is locked in stops 9 and 10 by means of lock pin 12.

As shown in FIG. 3, valve shaft 7 is mounted for rotation in valve body 1 by means of upper flanged block 11 and lower flanged block 13 which may be the equivalent of open and closed end ball bearing blocks which may be packed to prevent the entrance thereinto of foreign material flowing through the valve.

As further shown in FIG. 3, valve shaft 7 is affixed to ball shaft 15 on which ball or sphere 17 is supported.

Ball 17 may be of any material of a compressive nature, having a Durometer hardness between about 10 and about 70, neoprene, preferably between about 30 and about 65; for example, about 55 Durometer hardness has been found particularly suitable. The ball can be composed of neoprene, polyurethane, rubber, fluorinated acrylic rubber, butyl rubber, elastomers, acrylonitrile rubber, nylon, fluoroelastomer (e.g., Viton), etc. Ball 17 is adapted to be carried on shaft 15 using a sleeve formed diametrically through ball 17 through which shaft 15 extends. Ball 17 is mounted on shaft 15 in such a manner that ball 17 is free to rotate about shaft 15 and is displaceable along shaft 15.

Referring now to FIG. 4, ball 17 is movable by means of valve shaft 7 so as to be positioned alternately in outlets 4 and 5. As will be seen, ball 17 is sized in relation to the diameters of outlets 4 and 5 to fit therein to a distance somewhat less than that distance between the forward periphery of the ball and the nearest wall of the sleeve formed in the ball for shaft 15. For example, in a nominal 8-inch valve having an outlet flange inside diameter of 7 13/16 inches, a ball of 9¼ inches outside diameter is suitable.

Outlets 4 and 5 from the valve body consist of flanges 20 against which bear, on the inside facing, seal rings 21 which act as seats for ball 17 in the closed position, and which may be integral with the flange or separate therefrom. If separable, seal rings 21 are maintained in place by seal ring retainers 22 secured in position by cap screw means 23. The relationship between seal ring retainer 22 and seal ring or seal ring seat 21 is such that ball 17 bears against seal ring seat 21. When the valve is in the closed position, ball 17 is slightly indented, being pressured against seal ring seat 21 as effected by the lock pin arrangement previously mentioned.

The seal rings can be independently composed of any of the materials used for the ball and, in addition, can be, and most often is, composed of normally noncompressible materials such as, for example, steel, a ceramic, a fused carbide, such as Carborundum and materials approaching diamond hardness. The seal ring can be harder or softer than the ball but is usually composed of a harder material. When softer, it is preferred that the hardness of the seal rings vary not more than 10 Durometer units from the hardness of the ball or sphere. The softer materials for both ball and seal ring are employed in low pressure operation. A plurality of seal rings, composed of the same or different materials, can be employed for engagement of the ball and used in adjoinment or in spaced relationship with each other. It is preferable in this case to employ seal rings of decreasing diameter in the direction of flow through the port to conform with the contour of the ball when positioned in the seal aperture or port.

In the course of operating the conventional ball valve, that is, in swinging the ball from one port into the other thus opening the former port and closing the latter port, that portion of the ball nearest the valve shaft first contacts the seat of the port. Thereafter, the ball makes sliding contact thereon as the valve shaft continues to turn and contact is established between the remaining portions of the periphery of the ball and the surface of the seat. This action results in considerable wear on that portion of the ball first making contact with the seat. Furthermore, should particulate material be adhering either to the contact surfaces of the ball or of the seat, such material is compressed into the surface of the ball by the seating with the result that the possibility of leakage of the closure results.

In the valve of the present invention, the seats for ball 17 are not aligned in a right angle relationship to the arc of travel of the ball as it is moved by ball shaft 7. Instead, the port seats, whether separable as seal rings 21 or integral with the flange are angularly disposed in relationship to the path or arc of travel of the ball as it moves from one port to the other. This may be accomplished in several ways. For example, the seal rings, themselves, may be angularly disposed or, if flanges with integral seats are used, the entire flange may be angularly disposed.

In either instance, the port seat is so positioned angularly that a portion of the face thereof in one of the quadrants remote from the valve shaft is contacted by the ball before other contact between ball and port seat is established. Alternately expressed, if a point of reference is arbitrarily established on the face of seal ring 21 at a point in closest proximity to valve shaft 7, seal ring 21 will be so disposed that the initial contact between ball 17 and the seat face will be at a point approximately between 45° to approximately 315° from that point of reference. Seating is accomplished when compression of the ball is exerted at a point approximately between 135° and approximately 225°.

The angular positioning or disposing of seal ring seats 21, or of the port of which the seat face is an integral part can be effected by disposing seal ring seat 21 out of that position in which its horizontal axis is perpendicular to a tangent to the arc of travel of the ball as it enters the port, or by disposing seal ring seat 21 out of that position in which its vertical axis is perpendicular to the horizontal plane along which the ball travels as it enters the port. In either case, however, disposal of the seat from the normal should not be to such a degree that the effectiveness of the ball in forming a leak-proof closure is destroyed. For example, a displacement of not more than 10° from normal is desirable.

FIG. 5 indicates the positioned relationships of the seats 21, and of the ball 17. The arc of travel of ball 17 is also shown. Ball 17 is shown in phantom in two positions; in the first or contact position, ball 17 is shown with a segment of its periphery most distant from valve shaft 7 having made contact with seat 21 while a segment of its periphery nearest valve shaft 7 is just making contact with seat 21; in the second or seated position, ball 17 is shown seated within outlet 5 and in contact around its entire periphery with seat 21. It has been displaced, however, along ball shaft 15 toward valve shaft 7.

As will be elaborated upon hereinafter, the disposition of seat 21 as described tends to impart to the ball a lateral and a rotating motion upon contact with the seat. Should the seat be disposed such that the first contact of the seat face with ball 17 is 90° or 270° from the previously established point of reference nearest the valve shaft 7, the principal motion imparted to ball 17 will be one of rotation around ball shaft 15. Should the positioning be such that first contact between ball 17 and seat face 21 occurs diametrically opposite the point of reference, i.e., at 180° therefrom on seat face 21, the principal motion imparted to ball 17 will be one of movement along ball shaft 15. At 45° and at 315° from the point of reference, most pronounced movement of ball 17 in both rotation around and along ball shaft 15 is achieved. Satisfactory motions in both directions is generally accomplished between about 15° and 75° and between about 285° and 345°, a different direction of rotation of the ball around the shaft being accomplished in each of the two instances.

FIG. 6 indicates the mounting of ball 17 within the valve body in such a manner as to facilitate the displacement of ball 17 along ball shaft 15.

As previously mentioned, ball 17 is carried on shaft 15, shaft 15 being retained on valve shaft 7 by means of key 33, shaft 15 extending through a sleeve formed diametrically through ball 17. Ball 17 is mounted on shaft 15 in such a manner that ball 17 is free to rotate about shaft 15 and is displaceable along shaft 15. Outboard retainer 30, fitted to shaft 15 and maintained in position by retainer key 31, limits the diametrical movement in the outboard direction while inboard retainer 32 limits the diametrical movement of ball 17 in the direction of valve shaft 7, so that the ball floats between retainers 30 and 32 during stages of engagement and disengagement under certain conditions of operation, such as when a relatively high force is exerted in an outward direction on the ball shaft when rotating the valve shaft at a high velocity. In this case, shaft 15 is of such length that there exists space 34 between ball 17 and inboard retainer 32 or between ball 17 and outboard retainer 30, depending on the direction along shaft 15 in which ball 17 is displaced. In this particular view, the ball is being swung at high velocity in the direction indicated by the arrow and hence the ball tends to take a position at that end of shaft 15 fartherest from valve shaft 7 forming space 34 between ball 17 and inboard retainer 32, being urged into this position by centrifugal force. When the ball is swung into the opposite port under high velocity conditions, the position of ball 17 on shaft 15 is similar. Being so positioned against the outboard retainer, initial contact between the ball and the port seat at a point beyond the 90° position and approaching the 180° position with reference to the valve shaft is insured. It is upon contact with the port seat and seating the ball within the port seat that space 34 decreases as ball 17 is displaced inwardly towards valve shaft 7, and a space is formed between ball 17 and outboard retainer 30.

In a preferred operation of the valve of this invention as shown in FIG. 4, as ball 17 is moved into an outlet port 4, ball 17 further contacts seal ring seat at a point which is in the lower quadrant of seal ring seat 21 at approximately the "four-thirty o'clock" position. Contact is such that as ball 17 is forced further into outlet 4, the contact between ball 17 and seat 21 imparts three motions to the ball. One motion imparted is lateral along ball shaft 15; a second motion is rotation around ball shaft 15; a third motion, a lesser one, is one of reverberation of the ball against all contact surfaces of the seal ring seat 21 as the ball comes to rest within the port. The sealing closure is effected by three motions, namely, rotation, shearing and compressing.

As a result of the initial contact made between ball 17 and seal ring seat 21, the ball tends to roll into its seated position within the port. This rolling motion tends to maximize the differences in respect to surfaces contacted when positioning the ball from the last previous positioning and hence insures uniform wear of ball and seat and accordingly extends the life of these elements. Similarly, the rolling motion tends to wipe the surface of the ball against the seal ring in a slightly sidewise motion immediately prior to seating and in doing so, tends to clean the surface of the ball carrying particles away from the area of fixed contact while providing a leak-proof seating relationship between ball and seal ring seat. This slanted wiping motion prevents particles from being imbedded in the surface of the ball or seal ring in the area of fixed contact as is caused by scraping.

Upon moving the ball out of the port, a rolling action is again imparted to the ball as it clears the seat, thereby maximizing the incidence of variation in seating position in the other port from that previously taken, thus further increasing the uniformity of wear of the ball and seal ring seats and extending the life of operability.

It will be obvious to one skilled in the art that many variations can be made in the embodiments herein described. Such, however, are not considered as departing from the scope of the invention. For example, while the attached drawings show a single inlet port valve and a double outlet port valve, the present invention is applicable to a ball valve having only a single outlet. Similarly, while this invention has been described with reference to a valve having an outlet port and an inlet port, this invention is applicable to a valve having a multiplicity of inlet ports. Further, this invention has been described with reference to a manually operated valve whereas the valve can be automatically operated by means of electrical, hydraulic or pneumatic actuators. The valve of the present application can also contain several pairs of outlet ports, arranged in a series of chambers, e.g., one pair above the other or one pair along side the other with engaging means or stopping means on said valve shaft adapted to position the ball shaft and sphere in each chamber for operation of the ports located therein. Such an arrangement also includes movable sealing means to seal off the pair of ports which are not under operation. Locking means can also be provided in positioning the valve shaft during operation in a certain chamber so that uniform motion of the rotation of the ball shaft is achieved. Further variations include an odd number of outlet ports where it is desirable to permit flow through two ports while alternately closing off one or more of the others.

I claim:

1. In a valve which includes a valve body having at least one inlet port and a pair of outlet ports, a valve shaft extending internally in said body and integrally attached to external means for rotating said valve shaft, ball shaft means extending from said valve shaft inside of said body and disposed in a substantially perpendicular position thereto, a sphere having a diameter greater than the diameter of the outlet ports and carried by said ball shaft means and adapted to rotate around and be displaceable along the length of said ball shaft means as the valve shaft is rotated in a substantially linear plane for seating said sphere in one of said pair of outlet ports, and each of said outlet ports forming a circular seat for reception of said sphere, the improvement which comprises: disposing said seat angularly so that the extended plane of the seat is not perpendicular to the tangent to the arc of travel of the sphere as the sphere enters the port and disposed so that initial contact with said sphere is made at a point on the circular seat which is 45° to 315° distant from the point which is nearest the valve shaft so as to provide a slanted wiping motion to the surface of the sphere.

2. The valve defined in claim 1 in which said seat of said outlet port is formed by a seating ring having an angular displacement not in excess of 10° from the arc of travel of the sphere as the sphere enters the port.

3. The valve of claim 2 in which initial contact of said sphere with said seating ring is made at a point on the ring which is 45° to 315° distant from the position of the shaft so that positioning of the sphere causes rotation and shearing motion of the sphere before fixed positioning by compressing the sphere against the entire inner surface of the seating ring and so that rotation and shearing is again induced when said sphere is withdrawn from the seating ring and moved in a direction away from said port.

4. The valve defined in claim 1 in which said circular seat of said outlet port is separable from the body enclosing the outlet port.

5. The valve defined in claim 1 in which said circular seat of said outlet port is integral with the body enclosing said outlet port.

6. The valve defined in claim 1 in which said sphere is comprised of a compressible rubbery material having from about 30 to about 65 Durometer hardness.

7. The valve defined in claim 1 which valve seat is formed by a seal ring composed of a material at least as hard as said sphere up to a hardness of a fused carbide or a ceramic.

8. The valve defined in claim 1 in which the valve seat is formed by a plurality of seal rings of diameter decreasing in the direction of flow through said port so as to conform with the contour of the sphere when positioned in said port.

9. The valve of claim 8 in which the plurality of seal rings are composed of similar or dissimilar material having a Durometer hardness of at least 10 and are employed in adjoinment.

10. The valve of claim 1 in which said sphere rotates around said ball shaft means and is floated along the length of said ball shaft means between limits defined by an inner and an outer retainer means spaced at a greater distance apart than the diameter of the ports.